(12) United States Patent
Brown et al.

(10) Patent No.: US 8,516,573 B1
(45) Date of Patent: Aug. 20, 2013

(54) METHOD AND APPARATUS FOR PORT SCAN DETECTION IN A NETWORK

(75) Inventors: Philip E. Brown, Westfield, NJ (US); Jeanette LaRosa, Kingston, NJ (US); Chaim Spielman, Spring Valley, NY (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1777 days.

(21) Appl. No.: 11/316,273

(22) Filed: Dec. 22, 2005

(51) Int. Cl.
*H04L 29/06* (2006.01)
(52) U.S. Cl.
USPC .......... 726/22; 726/23; 726/26; 709/225; 370/230
(58) Field of Classification Search
USPC ............ 370/230; 709/225; 726/22, 23, 726/26
See application file for complete search history.

(56) References Cited

U.S. PATENT DOCUMENTS

| | | | |
|---|---|---|---|
| 7,483,972 B2 * | 1/2009 | Bhattacharya et al. | 709/224 |
| 7,752,665 B1 * | 7/2010 | Robertson et al. | 726/23 |
| 7,908,655 B1 * | 3/2011 | Bhattacharyya et al. | 726/22 |
| 2002/0129264 A1 * | 9/2002 | Rowland et al. | 713/200 |
| 2004/0199791 A1 * | 10/2004 | Poletto et al. | 713/201 |
| 2004/0215972 A1 * | 10/2004 | Sung et al. | 713/201 |
| 2005/0147037 A1 * | 7/2005 | Maimon et al. | 370/230 |
| 2006/0080437 A1 * | 4/2006 | Lake | 709/225 |
| 2006/0090074 A1 * | 4/2006 | Matoba | 713/171 |
| 2010/0115617 A1 * | 5/2010 | Weber et al. | 726/23 |
| 2011/0185426 A1 * | 7/2011 | Zuk | 726/23 |

\* cited by examiner

*Primary Examiner* — Jeffrey Pwu
*Assistant Examiner* — William Corum, Jr.

(57) ABSTRACT

Method and apparatus for port sweep detection in a network is described. In one example, log data is obtained for a period of time. The log data is associated with a plurality of devices in the network. The log data is processed to identify connection requests from a source key for a port at a number of target internet protocol (IP) addresses. An alarm is generated if the number of target IP addresses associated with the connection requests from the source key exceeds a threshold.

20 Claims, 3 Drawing Sheets

METHOD AND APPARATUS FOR PORT SCAN DETECTION IN A NETWORK

BACKGROUND OF THE INVENTION

1. Field of the Invention

Embodiments of the present invention generally relate to network monitoring and, more particularly, to a method and apparatus for port scan detection in a network.

2. Description of the Related Art

Networks typically monitor for abnormal activities that may suggest some type of malicious attack is underway. One type of monitored activity is port scanning. A port scanner is a software application that searches a network host for open ports. The most common protocol stack used by networks is transmission control protocol/internet protocol (TCP/IP). In TCP/IP, hosts are referenced using an IP address and a port number. There are 65,535 distinct and usable port numbers. In some literature, a "port scan" is referred to as a single source IP address searching through all 65,535 ports on a system to detect an open port. A "port sweep" is referred to as a source IP searching multiple systems for open ports. The term "port scan", as used herein, is meant to encompass both activities.

The information gathered by a port scan has many legitimate uses, including the ability to verify the security of a network. Port scanning can however also be used by those who intend to compromise security. Hackers rely on port scans to locate open ports and flood the host with large quantities of data. Hackers may exploit known vulnerabilities by cleverly crafting a packet in a way that overflows memory, and loads exploit code. They may then send this to targeted computers to gain access. Such behavior can compromise the security of a network and the computers therein, resulting in the loss or exposure of sensitive information and the ability of the network to function.

Current detections of scan activity analyze reporting devices in the network, by type, e.g., firewall analysis, network flow data analysis, etc. However, clever hackers may slow down and arrange the scanning in a way that a threshold may not be reached to signal an alarm for a specific device. Accordingly there is a need in the art for analyzing scan activity by looking across various devices in an attempt to detect scan activity that would not otherwise be detected by the individual systems.

SUMMARY OF THE INVENTION

Method and apparatus for scan (port sweep) detection in a network is described. In one embodiment, log data is obtained for a period of time. The log data is associated with a plurality of devices in the network. The log data is processed to identify connection requests from a source key for a port at a number of target internet protocol (IP) addresses. An alarm is generated if the number of target IP addresses associated with the connection requests from the source key exceeds a threshold.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
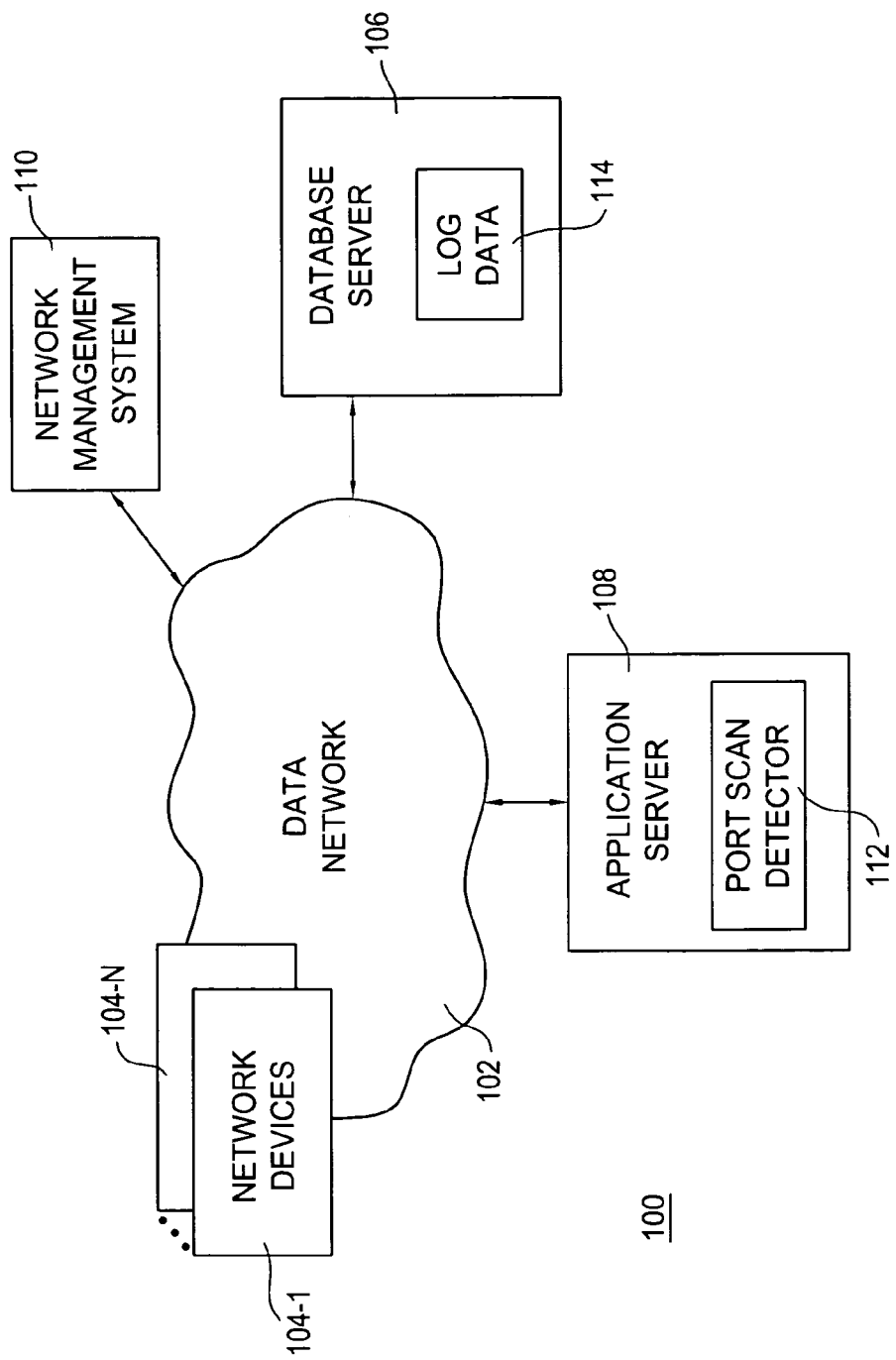
FIG. 1 is a block diagram depicting a network architecture in accordance with one or more aspects of the invention.

FIG. 1 is a block diagram depicting a network architecture 100 in accordance with one or more aspects of the invention. The network architecture 100 illustratively includes a network 102, network elements 104-1 through 104-N (collectively referred to as network elements 104), a database server 106, an application server 108, and a network management server 110 (where N is an integer greater than zero). The network 102 comprises a packet network configured to propagate packets in accordance with a particular network protocol, such as internet protocol (IP), and transport protocol, such as transmission control protocol (TCP), user datagram protocol (UDP), and the like.

The network elements 104 include routers, firewalls, proxy servers, web servers, and like type network devices known in the art. The network elements 104 are configured to generate log data, which are exported to the database server 106. The log data for a network element includes entries that list actions that have occurred with respect to the network element. Notably, the log data for a network element includes entries associated with requests for open ports. The entries include information associated with the connection request, such as source IP address for the request, target port, target IP address, user identifier (ID), a message indicating result of the request, and like type log parameters known in the art.

The database server 112 is configured to collect log data 114 from the network elements 104 in the network 102. The log data 114 may be collected periodically. Older data may be expunged from the database server 112 after a predefined time period. Each of the network elements 104 may produce log data having a different format. The log data from the network elements 104 may be normalized before being stored by the database server 106. That is, each log entry maintained by the database server 112 may have predefined fields, such as fields for a message indicating type of action (e.g., connection request for a port), type of network device, time, source IP address, target IP address, target port, and the like. The database server 106 may implement any database platform known in the art, such as a database platform commercially available from Oracle Corporation.

The application server 108 is configured to implement a port scan detector 112. The port scan detector 112 queries the database server 106 for log data for a particular period of time corresponding to multiple network devices. The port scan detector 112 processes the log data to detect anomalous activity that is indicative of unauthorized port scanning. For each instance of anomalous activity, the port scan detector 112 generates an alarm. The alarms generated by the port scan detector 112 are captured by the network management system 110, where they can be acted upon by a network operator. Operation of the port scan detector 112 is described below. Those skilled in the art will appreciate that the network architecture 100 is merely illustrative and that the port scan detector 112 may be employed in a myriad of network architectures. In general, the port scan detector 112 is configured to process log data produced by various network devices and produce alarms in response to detection of anomalous activity.

Figure 2:
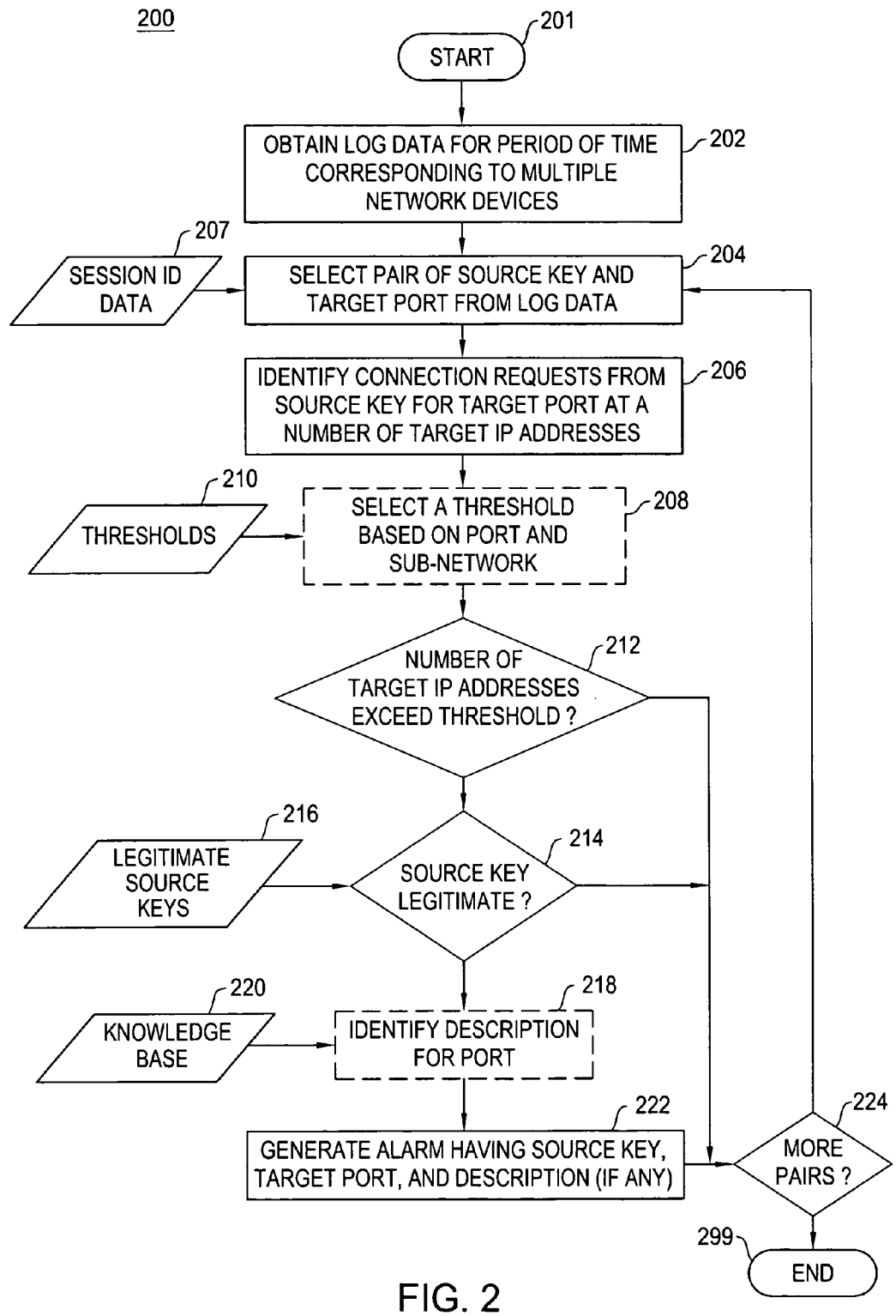
FIG. 2 is a flow diagram depicting an exemplary embodiment of a method for port scan detection in a network in accordance with one or more aspects of the invention.

FIG. 2 is a flow diagram depicting an exemplary embodiment of a method 200 for port scan detection in a network in accordance with one or more aspects of the invention. The method 200 may be performed by the port scan detector 112 of FIG. 2. The method 200 begins at step 201. At step 202, log data is obtained for a period of time corresponding to multiple network devices. That is, the log data corresponds to logs produced by the network devices for a predefined period of time. The time period may comprise any duration, e.g., a shorter duration, such as one hour, or a longer duration such as three days.

The log data obtained at step 201 includes entries where a particular source IP address attempted to connect to a target IP address using a target port. At step 204, the log data is processed to select a pair of source key and target port. A source key comprises an indication of the source of connection requests for the target port. In one embodiment, the source key comprises a source IP address in the log data. In another embodiment, the source key comprises either a source IP address or a session identifier associated with a source IP address, such as a virtual private network (VPN) session identifier or a dynamic host control protocol (DHCP) session identifier. Notably, a particular source IP address may be assigned to multiple users within the time period for the log data (i.e., a source IP address may be used for multiple sessions). Each of the sessions is assigned a particular identifier by the network. Session identifier data 207 may be analyzed to derive session identifiers for source IP addresses in the log data. If a source IP address is associated with one or more session identifiers, then these session identifiers are used as source keys and are treated separately by the method 200. If a source IP address is not associated with any session identifiers, then the source IP address is used as a source key.

At step 206, connection requests from the source key for the target port are identified at a number of target IP addresses. That is, the log data is processed to identify a number of target IP addresses with which the source key attempted to communicate using the target port. In one embodiment, the method 200 proceeds from step 206 to step 212. At step 212, a determination is made whether the number of target IP addresses identified for the pair of source key and target port has exceeded a threshold. For example, the threshold may comprise 300 target IP addresses, although other thresholds may be used for more or less target IP addresses.

In another embodiment, the method 200 proceeds from step 206 to optional step 208. At step 208, threshold data 210 is analyzed to select a threshold based on the target port and a sub-network for the network devices. The threshold data 210 may store a plurality of thresholds associated with a plurality of ports and a plurality of sub-networks. Each sub-network comprises a designated portion (i.e., branch) of the network. A portion of a network may be physically defined (e.g., a particular group of network devices) or logically defined (e.g., a particular VPN). Within each defined sub-network, each of the ports may be associated with a particular threshold. The ports may have different thresholds. In one embodiment, the threshold for a particular port within a particular sub-network is determined based on an average number of connection requests for the port within the sub-network and a standard deviation for the average over a time period. For example, a particular port within a particular sub-network may receive 50 connection requests on average with a standard deviation of 10 connection requests. A possible threshold for this particular port/sub-network combination may be 60 connection requests.

If the number of target IP addresses does not exceed the threshold, the method 200 proceeds to step 224. At step 224, a determination is made whether there are more source key/target port pairs to process. If not, the method 200 ends at step 299. Otherwise, the method 200 returns to step 204 and repeats for another source key/target port pair. If the number of target IP addresses does exceed the threshold at step 212, the method 200 proceeds to step 214. At step 214, a determination may be made whether the source key is designated as a legitimate source key. That is, a list of legitimate source keys 216 may be maintained associated with legitimate port scanners in the network. If the source key is associated with a legitimate port scanner, the method 200 proceeds from step 214 to step 224. In one embodiment, if the source key is not associated with a legitimate port scanner, the method 200 proceeds from step 214 to step 218.

At optional step 218, a knowledge base 220 is analyzed to identify a description for the target port. Notably, the knowledge base 220 may include known exploits, vulnerabilities, and peer-to-peer activities for particular target ports. For example, certain viruses or worms are known to exploit particular ports. If there is no known description for a port in the knowledge base 220, then the description indicates that there are no known exploits, vulnerabilities, and peer-to-peer activities associated with the target port. For known exploits, vulnerabilities, and peer-to-peer activities associated with the target port, the description includes information associated with the particular exploit, vulnerability, and peer-to-peer activity (e.g., a name of a potential virus or worm). The method 200 then proceeds to step 222.

In another embodiment, the method 200 proceeds directly from step 214 to step 222. At step 222, an alarm is generated having the source key, the target port, and a description that maps the activity to a known exploitation, vulnerability, or peer-to-peer activity (if identified at step 218). The method 200 proceeds from step 222 to step 224. While the method 200 has been described as serially processing source key/target port pairs, those skilled in the art will appreciate that the source key/target pairs may be processed concurrently (e.g., in parallel).

The method 200 is device agnostic and looks across network device types. In this manner, the method 200 can detect port scan activity even if the thresholds are not exceeded for the individual network devices. In addition, the method 200 may employ a logical source key, rather than a source IP address. This allows for more accurate alarm generation in scenarios where a particular source IP address is associated with multiple sessions (e.g., multiple VPN sessions or DHCP sessions). Moreover, in addition to detection of port scans, the method 200 may map the activity based on port to a knowledge base of known exploits, vulnerabilities, and peer-to-peer applications. In this manner, the alarm may be handled by a technical response operator without the need for additional analytical research. The method 200 does not rely on signatures associate with such exploits and thus yields a low number of false positive alarms.

Figure 3:
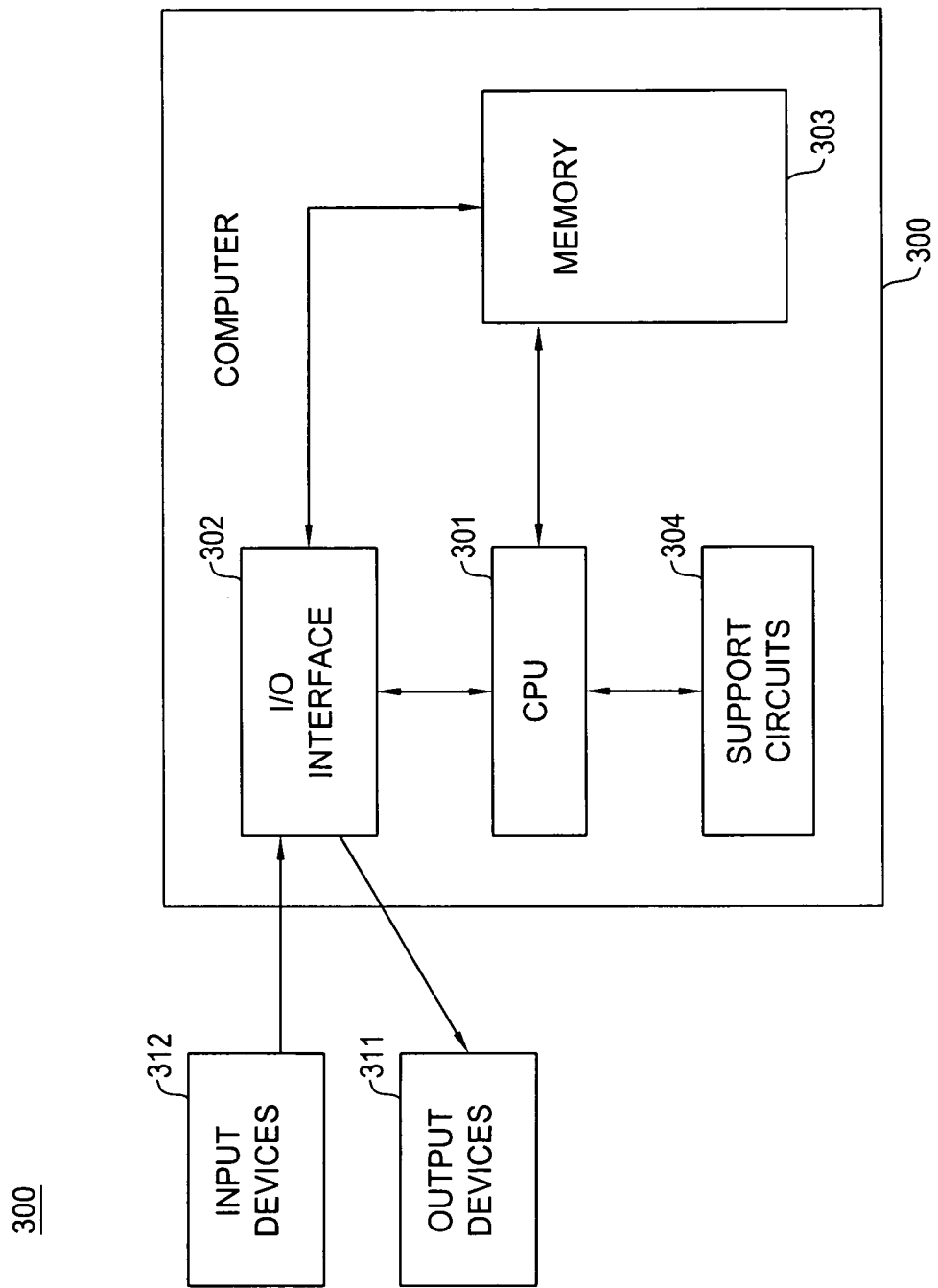
FIG. 3 is a block diagram depicting an exemplary embodiment of a computer suitable for implementing the processes and methods described herein.

FIG. 3 is a block diagram depicting an exemplary embodiment of a computer 300 suitable for implementing the processes and methods described herein. Notably, the computer 300 may be used to implement the port scan detector 112 and the method 200. The computer 300 includes a central processing unit (CPU) 301, a memory 303, various support circuits 304, and an I/O interface 302. The CPU 301 may be any type of microprocessor known in the art. The support circuits 304 for the CPU 301 include conventional cache, power supplies, clock circuits, data registers, I/O interfaces, and the like. The I/O interface 302 may be directly coupled to the memory 303 or coupled through the CPU 301. The I/O interface 302 may be coupled to various input devices 312 and output devices 311, such as a conventional keyboard, mouse, printer, and the like.

The memory 303 may store all or portions of one or more programs and/or data to implement the processes and methods described herein. Notably, the memory 303 may store program code to be executed by the CPU 301 for performing the method 200 of FIG. 2 and implement the port scan detector 112 of FIG. 1. Although one or more aspects of the invention are disclosed as being implemented as a computer executing a software program, those skilled in the art will appreciate that the invention may be implemented in hardware, software, or a combination of hardware and software. Such implementations may include a number of processors independently executing various programs and dedicated hardware, such as ASICs.

The computer 300 may be programmed with an operating system, which may be OS/2, Java Virtual Machine, Linux, Solaris, Unix, Windows, Windows95, Windows98, Windows NT, and Windows2000, WindowsME, and WindowsXP, among other known platforms. At least a portion of an operating system may be disposed in the memory 303. The memory 303 may include one or more of the following random access memory, read only memory, magneto-resistive read/write memory, optical read/write memory, cache memory, magnetic read/write memory, and the like, as well as signal-bearing media as described below.

An aspect of the invention is implemented as a program product for use with a computer system. Program(s) of the program product defines functions of embodiments and can be contained on a variety of signal-bearing media, which include, but are not limited to: (i) information permanently stored on non-writable storage media (e.g., read-only memory devices within a computer such as CD-ROM or DVD-ROM disks readable by a CD-ROM drive or a DVD drive); (ii) alterable information stored on writable storage media (e.g., floppy disks within a diskette drive or hard-disk drive or read/writable CD or read/writable DVD); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct functions of the invention, represent embodiments of the invention.

While the foregoing is directed to embodiments of the present invention, other and further embodiments of the invention may be devised without departing from the basic scope thereof, and the scope thereof is determined by the claims that follow.

The invention claimed is:

1. A method of port scan detection in a network, comprising:
    obtaining, via a processor, log data for a period of time, the log data of a plurality of devices in the network;
    processing, via the processor, the log data to identify connection requests from a source key for a port at a number of target internet protocol addresses, wherein the source key comprises a session identifier that identifies one of a plurality of sessions that shares a source internet protocol address, wherein connection requests are analyzed based upon the session identifier of the source key; and
    generating, via the processor, an alarm if the number of target internet protocol addresses of the connection requests from the session identifier of the source key exceeds a threshold.

2. The method of claim 1, further comprising:
    obtaining a list of legitimate source keys;
    wherein the alarm is generated if the source key is not in the list of legitimate source keys.

3. The method of claim 1, wherein the alarm includes values for the source key and the port.

4. The method of claim 3, further comprising:
    obtaining a table associating ports with descriptions;
    wherein the alarm further includes a description of the port.

5. The method of claim 1, further comprising:
    obtaining a plurality of thresholds for a plurality ports and a plurality of sub-networks; and
    selecting the threshold from the plurality of thresholds based on the port and a sub-network for the plurality of devices.

6. The method of claim 1, wherein the session identifier comprises a virtual private network session identifier.

7. An apparatus for port scan detection in a network, comprising:
    a processor; and
    a computer-readable medium storing a plurality of instructions which, when executed by the processor, cause the processor to perform operations, the operations comprising:
        obtaining log data for a period of time, the log data of a plurality of devices in the network;
        processing the log data to identify connection requests from a source key for a port at a number of target internet protocol addresses, wherein the source key comprises a session identifier that identifies one of a plurality of sessions that shares a source internet protocol address, wherein connection requests are analyzed based upon the session identifier of the source key; and
        generating an alarm if the number of target internet protocol addresses of the connection requests from the session identifier of the source key exceeds a threshold.

8. The apparatus of claim 7, further comprising:
    obtaining a list of legitimate source keys;
    wherein the alarm is generated if the source key is not in the list of legitimate source keys.

9. The apparatus of claim 7, wherein the alarm includes values for the source key and the port.

10. The apparatus of claim 9, further comprising:
    obtaining a table associating ports with descriptions;
    wherein the alarm further includes a description of the port.

11. The apparatus of claim 7, further comprising:
    obtaining a plurality of thresholds for a plurality ports and a plurality of sub-networks; and
    selecting the threshold from the plurality of thresholds based on the port and a sub-network for the plurality of devices.

12. The apparatus of claim 7, wherein the session identifier comprises a virtual private network session identifier.

13. A non-transitory computer readable storage medium storing instructions which, when executed by a processor, cause the processor to perform operations of port scan detection in a network, the operations comprising:
    obtaining log data for a period of time, the log data of a plurality of devices in the network;
    processing the log data to identify connection requests from a source key for a port at a number of target internet protocol addresses, wherein the source key comprises a session identifier that identifies one of a plurality of sessions that shares a source internet protocol address, wherein connection requests are analyzed based upon the session identifier of the source key; and generating an alarm if the number of target internet protocol addresses of the connection requests from the session identifier of the source key exceeds a threshold.

14. The non-transitory computer readable storage medium of claim 13, further comprising:

obtaining a list of legitimate source keys;

wherein the alarm is generated if the source key is not in the list of legitimate source keys.

15. The non-transitory computer readable storage medium of claim 13, wherein the alarm includes values for the source key and the port.

16. The non-transitory computer readable storage medium of claim 15, further comprising:

obtaining a table associating ports with descriptions;

wherein the alarm further includes a description of the port.

17. The non-transitory computer readable storage medium of claim 13, further comprising:

obtaining a plurality of thresholds for a plurality ports and a plurality of sub-networks; and selecting the threshold from the plurality of thresholds based on the port and a sub-network for the plurality of devices.

18. The non-transitory computer readable storage medium of claim 13, wherein the session identifier comprises a virtual private network session identifier.

19. The method of claim 1, wherein the session identifier comprises a dynamic host control protocol session identifier of the source internet protocol address during the time period.

20. The apparatus of claim 7, wherein the session identifier comprises a dynamic host control protocol session identifier of the source internet protocol address during the time period.

* * * * *